United States Patent Office 3,677,984
Patented July 18, 1972

3,677,984
ELECTRODEPOSITION COATINGS FROM AMINE SALTS OF VINYL MODIFIED FATTY ACIDS
Herbert Aschkenasy and John Joseph Schuler, Jr., Louisville, and Jerry Efton Bower, Jeffersontown, Ky., assignors to Celanese Coatings Company, New York, N.Y.
No Drawing. Filed Apr. 17, 1969, Ser. No. 817,139
Int. Cl. C08f 3/44, 15/26; C09d 5/02
U.S. Cl. 260—21    10 Claims

ABSTRACT OF THE DISCLOSURE

The amine salt of an interpolymer of (a) an unsaturated fatty acid, (b) acrylic or methacrylic acid, (c) a vinyl aromatic monomer and (d) a monomer differing from (a), (b), and (c) is solubilized in an aqueous solution and applied to an electrically conductive substrate by electrodeposition.

BACKGROUND OF THE INVENTION

The field of art to which this invention pertains is amine salts of vinyl modified electrodeposition resins.

Water soluble electrodeposition resins are well known in the art. However, since most of these previously disclosed resins contain linseed type fatty acids and maleic anhydride, both of which cause polymer discoloration upon baking, the application of these electrodeposition resins has been limited to primers and other areas where light color is not necessary. Previously in the art, light baking color was obtained by the use of 100% acrylic or vinyl copolymers. However, these polymers yield films which are usually, thermoplastic and exhibit very poor flexibility and adhesion. By copolymerizing a low color fatty acid with various acrylic and vinyl monomers, solubilizing this polymer in water and applying it by electrodeposition, films are prepared which when baked are shown to exhibit low color and high flexibility.

An additional problem found with previously disclosed electrodeposition resins is their lack of exterior durability. By the compositions of this invention, coatings are prepared which are shown to have excellent color and gloss retention and chalk resistance when placed on exterior exposure.

SUMMARY OF THE INVENTION

By this invention an aqueous electrocoating bath is prepared which is comprised of the amine salt of an interpolymer of an unsaturated fatty acid, in some cases acrylic or methacrylic acid, a vinyl aromatic monomer and another monomer which can be polymerized therewith. The amine salt of the above interpolymer is prepared by neutralizing from 30 to 100% of the polymer's acidity. Optionally present in this electrocoating bath is a water soluble crosslinking agent and an oxygenated solvent. The process of applying a coating from this bath comprises placing an electrically conducting cathode in contact with said bath and applying a direct electric current between the anode and cathode. An adherent film is thereby deposited at said anode.

DESCRIPTION OF THE INVENTION

In preparing the interpolymers used in the electrocoating baths of this invention, the desired amount of unsaturated fatty acid is weighed into a reaction flask suitable for carrying out vinyl polymerizations. Normally, the reactor is equipped with a mechanical agitator, thermometer, sampling device, addition funnel and return condenser. The fatty acid is then heated to about 150° F. to about 300° F. and the addition of a solution of the desired initiator and unsaturated monomers is begun. Monomer addition times will vary depending upon the rate of polymerization. Generally such times will be about 1–5 hours with about 3 hours being the most desirable. After this initial monomer addition, small amounts of an oxygenated organic solvent or co-solvent can be added to decrease the viscosity of the polymer being formed in the reaction flask. The monomer-fatty acid polymerization is then continued at about 150° F. to about 400° F. (usually about 300° F.) until substantially all of the monomer has been converted to polymer. Additional small amounts of initiator can be added if substantially completed monomer conversion is not attained within 3 hours after the initial monomer addition has been completed. Although the aforementioned method is preferable, copolymerization of the above monomers and fatty acid can also be achieved by adding all the monomer and initiator to the fatty acid and then elevating the temperature and holding for monomer conversion.

Included among the compounds which are useful in initiating the polymerization of the various reactants of this invention are: isopropyl percarbonate, capryl peroxide, lauryl peroxide, benzoyl peroxide, dicumyl peroxide, tertiary butyl hydroperoxide, methyl ethyl ketone peroxide, di-tertiary-butyl peroxide, cumene hydroperoxide, azobis-isobutyronitrile, tertiary-butyl perbenzoate, tertiary-butyl peroctoate, hydrogen peroxide and various other fatty acid peroxides, alcoholic peroxides and other free radical promoting initiators.

Unsaturated fatty acids as defined in this invention are those acids which contain from 12 to 24 carbon atoms per molecule and are derived from drying and semi-drying oils, including dehydrated castor oil, corn oil, cottonseed oil, linseed oil, oiticica oil, perilla oil, poppy-seed oil, rapeseed oil, safflower oil, soya bean oil, sunflower oil, tall oil, tung oil, walnut oil and the like. The most preferable are those which exhibit good color when baked, examples of which are tall oil fatty acid and dehydrated castor oil fatty acid.

Selection of the preferred weight percent of fatty acid depends upon the amount of flexibilization desired and upon the acid value which would be required to produce a water soluble salt. Acceptable results are obtained when the weight percent of fatty acid is maintained between about 10 and about 60% of the weight of the total polymer. However, the preferable concentration of fatty acid is from about 25% to about 35% of the total weight of the polymer.

Generally, acrylic or methacrylic acid is co-polymerized with the monomers of this invention in amounts sufficient to increase the acid value of the resulting interpolymer to a point whre its amine salt is water soluble. However, when enough fatty acid is present to give the interpolymer an acid value of about 75 or above, no acrylic or methacrylic acid is needed for solubilization. On the other hand when small amounts of fatty acid are present (10 to 20 weight percent), as much as 15 weight percent of either acrylic or methacrylic acid may have to be used. In most cases, though, about 3 to about 6 weight percent of one or a mixture of both these acids produces the preferred results.

When selecting the amount of fatty acid and acrylic or methacrylic acid to use, it has been found that an acid value of about 40 is required in order to produce salts which are water soluble. When the acid value is increased above 125, water solutions of the resulting salts tend to have poor electro-coating properties. Generally, resins of an acid value of from about 40 to about 80 are found to produce the most desirable electrocoating baths.

Vinyl aromatic monomers as used in this invention include styrene, vinyl toluene, alpha methyl styrene, vinyl naphthalene and other alpha-beta ethylenically unsaturated aromatic monomers. These monomers are present in the films produced by this invention to impart adequate hardness and mar resistance. The preferred vinyl aromatic content is about 15–25 weight percent of the total composition with styrene being the preferable monomer. However, acceptable results are also found in the 10 to 40 weight percent range.

The different monomer copolymerizable with the previously mentioned fatty acid, vinyl aromatic and acrylic or methacrylic acid monomers is represented by the general formula

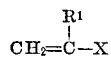

$R^1$ can be either methyl (—$CH_3$) or hydrogen (—H) while X can be a mono, di-, or non-substituted amide group

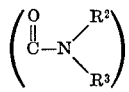

a nitrile group (—CN), or an alkyl ester group

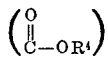

In this second group of formulae $R^2$ and $R^3$ can be the same group or different groups. Both, however, are selected from among the following functional groups hydrogen (—H), methylol (—$CH_2OH$), methylated methylol (—$CH_2$—O—$CH_3$), ethylated methylol,

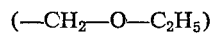

propylated methylol (—$CH_2$—O—$C_3H_7$) or butylated methylol (—$CH_2$—O—$C_4H_9$). Finally $R^4$ is selected from the group consisting of aliphatic molecules of the general formula —$C_mH_{2m+1}$ and hydroxy containing molecules of the general formula $C_nH_{2n}OH$. The first aliphatic group may have 1–8 carbon atoms ($m=1-8$) while the aliphatic hydroxy group can have from 2–4 carbon atoms ($n=2-4$). These above described monomers can be present singly or in mixtures.

Examples of the above types of monomers include acrylamide and methacrylamide, methylol acrylamide, methylated methylol acrylamide and methacrylamide, butylated methylol acrylamide and methacrylamide, methacrylonitrile and acrylonitrile, the esters formed by reacting methyl, ethyl, propyl, n-butyl, isobutyl, amyl, hexyl, heptyl, or octyl alcohols with either acrylic or methacrylic acid and those hydroxy esters formed by the reaction of acrylic or methacrylic acid with a saturated hydrocarbon, epoxy containing compound such as ethylene oxide, propylene oxide, butene-2-oxide and the like.

Acceptable results are obtained when monomers selected from the above group are present in amount of from 20 to 75 weight percent based on the total interpolymer solids composition. However, the preferred results are obtained when about 20 to 30 weight percent of a monomer such as methyl methacrylate, about 15 to 25 weight percent of a "soft" monomer such as ethyl or butyl acrylate and about 6–9 weight percent of an hydroxy alkyl acrylic or methacrylic ester such as hydroxypropyl methacrylate are used in the interpolymer of this invention.

Neutralization of the polymers of this invention is based upon the actual measurable acid value of the completed polymer. For example a completed polymer having a solids acid value of 56.1 would require 0.5 amine nitrogen equivalents to 50% neutralize 1000 solid grams of this polymer. Among the amines which can be used in forming these neutralization salts are those amines which form water soluble salts with the polymers described in this invention and have a carbon content of less than 10 carbon atoms per amine molecule. For the purposes of this invention ammonia or aqueous ammonia, commonly called ammonium hydroxide, are considered to be amines. Other amines include: diethyl amine, triethyl amine, monoethanol amine, diethanol amine, and monoisopropanol amine. The preferred amine is diethyl amine but preferred amine concentration depends upon the particular polymer that is to be salted. In general the preferred systems are those which contain just enough amine to form a water soluble salt. Excessive concentration of amine in an electro-coating system can lead to low rupture voltages and excessive film build. Normally, polymers with an acid value of 40–60 require about 0.7 to 1.0 equivalents of amine for each equivalent of acid found in the finished polymer. However, polymers of an acid value of a 100 or greater can require as little as 0.3 equivalent of amine for each equivalent of acid.

Solubilization of the polymers claimed in this invention can be effected by several methods. In the first method the polymer amine salt is pre-formed by adding the required amount of amine to the polymer. Water is then added to this salt and the resulting mixture agitated and in some cases warmed until a compatible, stable, water solution is obtained. The second and more preferable method is to add slightly warmed resin to a water-amine solution. This resulting mixture is then, as above, agitated and in some cases warmed until a compatible water solution is obtained. The solids content of the aqueous solutions is generally about 5 to about 25 weight percent, preferably about 5 to about 15 weight percent.

Increased water-polymer compatibility can be obtained by the use of a water soluble oxygenated solvent or co-solvent. Included in this classification are various mono and polyalcohols and polyether alcohols including mono and polyethers of ethylene and propylene glycol. In particular, the mono ethyl ether of ethylene glycol (ethyl Cellosolve) and the mono butyl ether of (butyl Cellosolve) are the preferred co-solvents. Based upon a 10% solids aqueous solution of the interpolymer of this invention, no more than 25 weight percent of this solution should comprise a co-solvent. Amounts of co-solvent in excess of this can cause excessive flow on the plated films.

Cross-linking agents can be selected from the following types: monomeric or partially polymerized alkoxylated methylmelamines and benzoguanamine resins, epoxy resins, urea-formaldehyde resins and the like. The most preferable are those cross-linking agents which are water soluble or water dispersible. For application on surfaces prepared for exterior applications a methoxy modified, monomeric methyl melamine type resin is preferred. Cross-linking agents however are not necessary to cure the composition claimed in this invention.

The level of cross-linking agent can vary from 10% to 40% of the total weight of the solids composition. However, the preferred levels are from 15 to 25 weight percent of the total solids composition.

Pigmented versions of the electro-coating baths herein disclosed are easily prepared. Pigmentation is achieved by first solubilizing a sample of the interpolymer as prepared above in a water solution containing about 0.3–1.0 equivalent of amine for each equivalent of acid in the finished polymer. The required pigments are then added and the entire solution agitated for about 30 minutes. Preferred pigment to binder ratio at this stage is about 2:1. When the agitation step is completed the solution is passed through a sand grinder yielding a pigmented base or mill base which usually is at about 35–50% solids in water. This mill base is then added to an additional amount of the resin which has been salted with amine. Water and a cross-linking agent, if desired, are also added and the entire mixture is agitated for one hour. This results in a paint which is at about 30–50% solids, has a pigment to binder ratio of about 1:3 and has from 30% to about 100% of its acidity neutralized. An electro-coating bath can be formed from this paint by reducing the solution solids to 10% with water.

The water solutions as described above can be applied to a substrate in any conventional manner but they are especially adapted to electrodeposition. In electrodeposition processes a water solution of the composition to be electrodeposited is placed in contact with an electrically conductive metal anode (the object to be coated) and an electrically conductive metal cathode (usually the side of the bath). The anode can be of any electrically conductive metal such as iron, steel, aluminum, galvanized steel, phosphatized steel, zinc, and the like. Upon the passage of a direct electric current between the anode and the cathode an adherent film of the coating composition is deposited upon the anode. The voltage used in this process can range from 1 to 500 or more volts. However, the preferred range is 50 to 300 volts.

The concentration of the coating composition in the aqueous bath used in electrodeposition is not critical and may range from 1 percent to 25 percent or greater. However, preferred concentrations for the bath are usually in the range of 5 to 15 percent by weight.

Electrodeposition produces a film which is essentially free of solvent and requires little or no baking to produce tack free films. But in order to produce films with satisfactory surface properties baking at 200 to 400° F. or higher is usually required.

Optimum voltages and dwell times depend upon the nature of the composition and the film characteristics desired. Generally a high voltage and a lengthy dwell time will result in thick films. However, any of the compositions disclosed by this invention will produce satisfactory films by the usual electro-coating methods.

A better understanding of this invention may be attained by referring to the following examples. Parts are understood to mean parts by weight.

Example 1

To a suitable reaction flask equipped with a mechanical agitator, thermometer and return condenser, 1800 parts of dehydrated castor oil fatty acid were added and heated to 284° F. An addition of 1608 parts of methyl methacrylate, 1206 parts of styrene, 180 parts of methacrylic acid, 1206 parts of ethyl acrylate and 120 parts of cumene hydroperoxide was carried out over a four hour period with reaction temperature maintained at 250° F. to 290° F. One hour after the above addition was completed, 1260 parts of butyl Cellosolve and 40 parts of cumene hydroperoxide were added. Reaction temperature was maintained at 290° F. for about one hour at which time 40 additional parts of cumene hydroperoxide and 40 parts of butyl Cellosolve were added. After holding the reactants for two more hours at 290° F. substantially all of the monomer was found to be converted to polymer. Reduced to 60 solids in butyl Cellosolve this polymer exhibited a solids acid value of 59, a Gardner color of 1–2 and a Gardner-Holdt viscosity of Y—Z at 25° C.

A mill base was prepared by adding 622.5 parts of the above resin to a solution of 39.8 parts of diethyl amine and 1671.3 parts of water. To this solution 1000 parts of rutile titanium dioxide were added and the resulting solution was agitated for about 30 minutes. This mill base was then passed through a sand grinder and added to a solution of 1068.5 parts of the resin prepared above and 42.3 parts of diethyl amine. After a homogeneous mixture was obtained 1661 parts of water were added along with 270 parts of a methoxy modified monomeric methyl melamine having a solids content of about 98–100 weight percent, a Gardner-Holdt viscosity of V—W at 25° C., a color of 1 on the Gardner scale and a weight per gallon of 10.0 lbs. This mixture after being agitated for one hour yielded a stable solution which was then reduced with sufficient water to a total solids content of 10%.

An electrodeposition bath using the above solution was prepared as in Example 2. Panels plated from this solution were baked for 30 minutes at 300° F. and placed on an exterior exposure in Florida at 45° south. After six months of this exposure little or no chalking, yellowing or loss of gloss was observed.

Example 2

Using the same procedure as in Example 1 a similar polymer was prepared containing 1800 parts of tall oil fatty acid rather than 1800 parts of dehydrated castor oil fatty acid as was used in Example 1. When the polymer produced in this manner was reduced to 60 solids in a butyl Cellosolve, it exhibited a Gardner-Holdt viscosity of X—Y, an acid value of 56 and a Gardner color of 2.

A solubilized sample of the resin as described above was prepared by heating 1250 parts of the resin solution to 130° F. and adding it to a solution of 1533 parts of water and 74 parts of diethyl amine. This solution was maintained for 1 hour at 100° F. at which time a sufficient amount of water was added to reduce the solids content of the water solution to 10%.

An electrodeposition bath using the above 10% solids solution was prepared by placing this solution in a one gallon electrically conductive metal can equipped with a mechanical agitator. Into this bath a steel panel was partially immersed. Using the sides of the can as a cathode and the steel panel as an anode, a voltage of 125 to 150 volts was applied for one minute producing an adherent film on the anode. The panel coated in this manner was then baked for 25 minutes at 360° F. A cured film resulted which had excellent gloss and low color.

Example 3

Using the same procedure as in Example 1, a copolymer of 600 parts of dehydrated castor oil fatty acid, 670 parts of methyl methacrylate, 502 parts of styrene, 75 parts of methacrylic acid, 503 parts of ethyl acrylate and 150 parts of hydroxypropyl methacrylate was prepared. This polymer when reduced to 60 solids in butyl Cellosolve exhibited a Gardner-Holdt viscosity of $Z_2$–$Z_3$ an acid value of 45 and a Gardner color of 2.

As in Example 2 a sample of the resin described in this example was solubilized using 1.0 equivalent of diethyl amine and reduced to 10% solids in water. Electrodeposition of panels from this 10% solids bath produced films which, when cured for 25 minutes at 360° F., exhibited low color and good adhesion and flexibility.

It is to be understood that the foregoing detailed description is given merely by way of illustration and that many variations may be made therein without departing from the spirit of the invention.

The embodiments of the invention in which an exclusive property or privilege is claimed are defined as follows:

1. An aqueous electrocoating bath of an amine salt of a curable composition which composition has an acid value of from about 40 to about 125 and comprises an interpolymer of (A) 10–60 weight percent of an unsaturated fatty acid, derived from a drying or semi-drying oil having from 12–24 carbon atoms per molecule;

(B) 0–15 weight percent of acrylic or methacrylic acid or mixtures thereof;

(C) 10–40 weight percent of a vinyl aromatic monomer;

(D) 20–75 weight percent of a different monomer copolymerizable therewith wherein said monomer is represented by the general formula

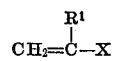

wherein $R^1$ is hydrogen (—H) or methyl (—$CH_3$)

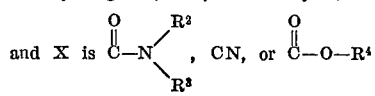

wherein R² and R³ are the same or different and consist of hydrogen (—H), methylol (—CH₂OH), methylated methylol (—CH₂—O—CH₃), ethylated methylol (—CH₂—OC₂H₅), propylated methylol (—CH₂—O—C₃H₇)

or butylated methylol (—CH₂—OC₄H₉),
and R⁴ is an aliphatic group represented by the general formula —C$_m$H$_{2m+1}$ wherein $m=1-8$
or R⁴ is an aliphatic group represented by the general formula —C$_n$H$_{2n}$OH wherein $n=2-4$
and wherein said amine salt is obtained by neutralizing from about 30 to about 100% of the acidity of said interpolymer with either ammonia or an aliphatic monoamine having fewer than 10 carbon atoms per molecule.

2. The electrocoating bath of claim 1 wherein said interpolymer comprises
25–35 weight percent of A
3–6 weight percent of B
15–25 weight percent of C
40–65 weight percent of D 3. The electrocoating bath of claim 1 wherein
(A) is dehydrated castor oil fatty acid,
(B) is methacrylic acid,
(C) is styrene,
(D) is a mixture of ethyl acrylate, methyl methacrylate and hydroxypropyl methacrylate.

4. The electrocoating bath of claim 1 wherein A is tall oil fatty acid.

5. The electrocoating bath of claim 1 wherein the amine is diethyl amine.

6. The electrocoating bath of claim 1 wherein the aqueous portion of said bath comprises from about 75 to about 100 weight percent water and from about 25 to about 0 weight percent of a water soluble oxygenated solvent.

7. The electrocoating bath of claim 6 wherein the water soluble oxygenated solvent is the monobutyl ether of ethylene glycol.

8. The electrocoating bath of claim 1 wherein about 10 to about 40 weight percent of the total solids composition comprises a water soluble or water dispersible cross-linking agent which is selected from the group consisting of monomeric and partially polymerized alkoxylated methylmelamines and benzoquanamine resins, epoxy resins, and urea-formaldehyde resins.

9. The electrocoating bath of claim 8 wherein said water soluble cross-linking agent is a methoxy modified monomeric methyl melamine resin.

10. The electrocoating bath of claim 8 wherein said water soluble cross-linking agent comprises about 15 to about 25 weight percent of the total solids content of said bath.

References Cited
UNITED STATES PATENTS

| | | | |
|---|---|---|---|
| 3,461,093 | 8/1969 | Walton et al. | 260—21 |
| 2,990,387 | 6/1961 | Bobalek et al. | 260—23 |
| 2,952,648 | 9/1960 | Swann et al. | 260—23 |
| 3,230,162 | 1/1966 | Gilchrist | 204—181 |
| 3,222,321 | 12/1965 | Sekmakas | 260—23 |
| 3,451,955 | 6/1969 | Koral et al. | 260—21 |
| 3,288,736 | 11/1966 | Wright et al. | 260—23 |
| 3,506,601 | 4/1970 | Sekmakas | 260—21 |

FOREIGN PATENTS

| | | | |
|---|---|---|---|
| 1,048,060 | 11/1966 | Great Britain | 260—23 |

M. J. WELSH, Primary Examiner

R. W. GRIFFIN, Assistant Examiner

U.S. Cl. X.R.

11—132 BE, 132 R, 161 UZ, 161 UT, 161 UN, 161 UC, 161 ZB; 260—23 AR, 23 CP, 23 ST, 29.2 EP, 29.2 UA, 29.2 N, 31.4 R, 31.4 EP, 32.4, 32.6 N, 32.6 R